(12) United States Patent
Watanabe et al.

(10) Patent No.: US 10,885,353 B2
(45) Date of Patent: Jan. 5, 2021

(54) INFORMATION PROCESSING APPARATUS, MOVING OBJECT, INFORMATION PROCESSING METHOD, AND COMPUTER PROGRAM PRODUCT

(71) Applicant: Kabushiki Kaisha Toshiba, Minato-ku (JP)

(72) Inventors: Tomoki Watanabe, Inagi (JP); Yuma Sano, Setagaya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 90 days.

(21) Appl. No.: 15/911,310

(22) Filed: Mar. 5, 2018

(65) Prior Publication Data

US 2019/0050649 A1    Feb. 14, 2019

(30) Foreign Application Priority Data

Aug. 8, 2017 (JP) .................................. 2017-153254

(51) Int. Cl.
*G06K 9/00* (2006.01)
*G06K 9/32* (2006.01)
(Continued)

(52) U.S. Cl.
CPC ........ *G06K 9/00805* (2013.01); *G01S 7/4026* (2013.01); *G01S 7/497* (2013.01);
(Continued)

(58) Field of Classification Search
CPC .......... G06K 9/00805; G06K 9/00771; G06K 9/6277; G06K 9/3241; G01S 2013/9367;
(Continued)

(56) References Cited

U.S. PATENT DOCUMENTS

2007/0285305 A1  12/2007  Tanaka et al.
2012/0053755 A1*  3/2012  Takagi .................. B60W 40/04
                                                          701/1
(Continued)

FOREIGN PATENT DOCUMENTS

JP    2007-333486        12/2007
JP    2013-101485 A       5/2013
(Continued)

*Primary Examiner* — Amara Abdi
(74) *Attorney, Agent, or Firm* — Oblon, McClelland, Maier & Neustadt, L.L.P.

(57) ABSTRACT

According to an embodiment, an information processing apparatus includes a position acquiring unit, and an occupancy level calculating unit. The position acquiring unit is configured to acquire position information representing a position where a target exists or no target exists, the position being measured by a sensor. The occupancy level calculating unit is configured to calculate an occupancy level distribution representing a level of occupancy, by the target, of each of a plurality of regions existing along a direction from the position of the sensor to the position indicated by the position information, based on the position information and measurement accuracy of the sensor, the occupancy level distribution being based on a non-measurement probability distribution representing a probability that measurement is not performed by the sensor.

9 Claims, 8 Drawing Sheets

(51) Int. Cl.
    *G08G 1/16*     (2006.01)
    *G01S 7/52*     (2006.01)
    *G01S 7/497*     (2006.01)
    *G06K 9/62*     (2006.01)
    *G01S 7/40*     (2006.01)
    *G08G 1/01*     (2006.01)
    *G01S 17/931*     (2020.01)
    *G06T 7/77*     (2017.01)
    *G01S 15/931*     (2020.01)
    *G01S 13/86*     (2006.01)
    *G01S 15/86*     (2020.01)
    *G01S 17/86*     (2020.01)
    *G01S 13/931*     (2020.01)

(52) U.S. Cl.
    CPC ........ *G01S 7/52004* (2013.01); *G01S 17/931* (2020.01); *G06K 9/00771* (2013.01); *G06K 9/3241* (2013.01); *G06K 9/6277* (2013.01); *G06T 7/77* (2017.01); *G08G 1/0112* (2013.01); *G08G 1/165* (2013.01); *G08G 1/166* (2013.01); *G01S 13/86* (2013.01); *G01S 15/86* (2020.01); *G01S 15/931* (2013.01); *G01S 17/86* (2020.01); *G01S 2007/4039* (2013.01); *G01S 2007/4975* (2013.01); *G01S 2007/52009* (2013.01); *G01S 2013/932* (2020.01); *G01S 2013/9322* (2020.01); *G01S 2013/9323* (2020.01); *G01S 2013/9324* (2020.01); *G01S 2013/93271* (2020.01); *G01S 2013/93273* (2020.01); *G01S 2015/937* (2013.01); *G06T 2207/30261* (2013.01)

(58) Field of Classification Search
    CPC ..... G01S 2013/9382; G01S 2013/9353; G01S 2013/9357; G01S 2013/9364; G01S 2013/9375; G01S 2007/52009; G01S 2007/4039; G01S 2007/4975; G01S 7/4026; G01S 7/497; G01S 7/52004; G01S 15/931; G01S 15/025; G01S 17/023; G01S 17/936; G01S 2015/937; G01S 13/86; G08G 1/0112; G08G 1/165; G08G 1/166; G06T 2207/30261; G06T 7/77
    See application file for complete search history.

(56) References Cited

U.S. PATENT DOCUMENTS

| | | | |
|---|---|---|---|
| 2013/0223686 A1* | 8/2013 | Shimizu | G08G 1/166 382/103 |
| 2016/0224803 A1* | 8/2016 | Frank | G06F 16/24578 |
| 2017/0116487 A1* | 4/2017 | Yamazaki | H04N 13/271 |
| 2017/0344021 A1 | 11/2017 | Sano et al. | |
| 2017/0344844 A1 | 11/2017 | Sano et al. | |
| 2017/0344888 A1 | 11/2017 | Sano et al. | |
| 2017/0345182 A1 | 11/2017 | Sano et al. | |
| 2018/0189599 A1 | 7/2018 | Sano et al. | |

FOREIGN PATENT DOCUMENTS

| | | |
|---|---|---|
| JP | 2014-137743 A | 7/2014 |
| JP | 2017-215939 | 12/2017 |
| JP | 2017-215940 | 12/2017 |
| JP | 2018-109564 | 7/2018 |
| WO | WO 2017/057058 A1 | 4/2017 |

* cited by examiner

INFORMATION PROCESSING APPARATUS, MOVING OBJECT, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-153254, filed on Aug. 8, 2017; the entire contents of which are incorporated herein by reference.

FIELD

Embodiments described herein relate generally to an information processing apparatus, a moving object, an information processing method, and a computer program product.

BACKGROUND

A system for creating an obstacle map on the basis of position information on points on an obstacle acquired from a distance sensor such as a laser sensor is known in the art. The obstacle map is a map indicating occupancy level (0.0 to 1.0) of the obstacle in each position. Since it is highly likely that there is an obstacle in the vicinity of the acquired position, a high value of occupancy level is set. In contrast, since it is unlikely that there is an obstacle in front of the acquired position, a small value of occupancy level is set. In addition, since it is difficult to sense the backside of the acquired position due to blocking, a median value of "0.5" indicating that presence of the obstacle is unknown is set as the occupancy level.

In the related art, if the accuracy of the sensor is low, the peak of the occupancy level may be lower than "0.5" in some cases. Therefore, in this case, it is difficult to set an appropriate value of the occupancy level.

DETAILED DESCRIPTION

According to an embodiment, an information processing apparatus includes a position acquiring unit, and an occupancy level calculating unit. The position acquiring unit is configured to acquire position information representing a position where a target exists or no target exists, the position being measured by a sensor. The occupancy level calculating unit is configured to calculate an occupancy level distribution representing a level of occupancy, by the target, of each of a plurality of regions existing along a direction from the position of the sensor to the position indicated by the position information, based on the position information and measurement accuracy of the sensor, the occupancy level distribution being based on a non-measurement probability distribution representing a probability that measurement is not performed by the sensor.

An information processing apparatus, a moving object, an information processing method, and a computer program product will now be described in details with reference to the accompanying drawings.

Figure 1:
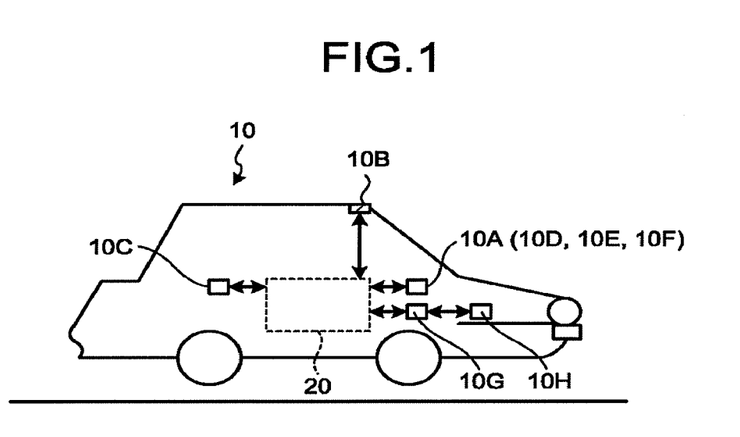
FIG. 1 is a diagram illustrating a moving object.

FIG. 1 is a diagram illustrating an exemplary moving object 10 according to an embodiment.

The moving object 10 includes an information processing apparatus 20, an output unit 10A, an external sensor 10B, an internal sensor 10C, a power control unit 10G, and a power unit 10H.

The information processing apparatus 20 is, for example, a dedicated or general-purpose computer. According to this embodiment, it is assumed that the information processing apparatus 20 is mounted on the moving object 10 by way of example.

The moving object 10 refers to an object that can move. The moving object 10 is, for example, a vehicle, a wagon, a flying object (manned air plane or unmanned airplane (such as an unmanned aerial vehicle (UAV) or a drone)), a robot, or the like. In addition, the moving object 10 is, for example, a moving object that travels in response to a manual driving operation or automatically travels without receiving a manual driving operation. According to this embodiment, it is assumed that the moving object 10 is a vehicle by way of example. The vehicle is, for example, a two-wheeled automobile, a three-wheeled automobile, a four-wheeled automobile, or the like. According to this embodiment, it is assumed that the vehicle is a four-wheeled automobile capable of an autonomous travel by way of example.

Note that the information processing apparatus 20 is not limited to a type mounted on the moving object 10. The information processing apparatus 20 may also be mounted on a stationary object. The stationary object refers to an object fixed on the ground. The stationary object is an object that is not movable or an object fixed on the ground. The stationary object is, for example, a guard rail, a pole, a parked vehicle, a road mark, or the like. In addition, the information processing apparatus 20 may also be mounted on a cloud server that executes processing via a cloud network.

The power unit 10H is a driving device mounted or the moving object 10. The power unit 10H is, for example, an engine, a motor, a wheel, and the like.

The power control unit 10G controls the power unit 10H. The power unit 10H is driven under control of the power control unit 10G. For example, the power control unit 10G controls the power unit 10H on the basis of information obtained from the external sensor 10E and the internal sensor 10C, existence probability information derived from the processing described below, or the like in order to automatically driving the moving object 10. An acceleration level, a braking level, and a steering angle, or the like of the moving object 10 are controlled by controlling the power unit 10H. For example, the power control unit 10G controls the vehicle so as to maintain a current traveling lane while avoiding an obstacle and maintains an interval from the front vehicle by a predetermined distance or longer.

The output unit 10A outputs various types of information. According to this embodiment, the output unit 10A outputs a map derived from the information processing apparatus 20. The map shows an occupancy level of the obstacle. The maps will be described below in more details.

The output unit 10A has a communication functionality for transmitting the map, a display functionality for displaying the map, a sound output functionality for outputting sound expressing the map, and the like. For example, the output unit 10A includes at least one of the communication unit 10D, the display 10E, and the loudspeaker 10F. Note that, in this embodiment, it is assumed that the output unit 10A has the communication unit 10D, the display 10E, and the loudspeaker 10F by way of example.

The communication unit 10D transmits the map to other devices. For example, the communication unit 10D transmits the map to other devices via a communication line known in the art. The display 10E displays the map. The display 10E is, for example, a liquid crystal display (LCD), a projector, a light, and the like known in the art. The loudspeaker 10F outputs sound expressing the map.

The external sensor 10B is a sensor for recognizing an external side in the vicinity of the moving object 10. The external sensor 10B may be mounted on the moving object 10 or on a location outside of the moving object 10. The location outside of the moving object 10 refers to, for example, another moving object, an external device, or the like.

The vicinity of the moving object 10 refers to a region within a predetermined range from the moving object 10. This range is an observable range of the external sensor 10B. This range may be set in advance.

The external sensor 10B acquires observation information of the external side. The observation information is information representing a result of observation for the vicinity of the installation position of the external sensor 10B. According to this embodiment, the observation information is information that can be used to derive position information of each of a plurality of detection points in the vicinity of the external sensor 10B (that is, the moving object 10).

The position information of the detection point is information representing a position of the detection point in a real space. For example, the position information of the detection point is information representing a distance from the external sensor 10B to the detection point and a direction of the detection point with respect to the external sensor 10B. These distance and direction can be expressed, for example, as position coordinates representing a relative position of the detection point with respect to the external sensor 10B, position coordinates representing an absolute position of the detection point, vectors, or the like. Specifically, the position information is expressed in a polar coordinates system or a Cartesian coordinates system. In this embodiment, it is assumed that the position information of the detection point is expressed in the polar coordinates system by way of example.

The detection point indicates each point individually observed by the external sensor 10B in a location outside of the moving object 10. For example, the external sensor 10B irradiates light to the vicinity of the external sensor 10B and receives reflection light reflected from a reflection point. This reflection point corresponds to the detection point. Note that a plurality of reflection points may be used as a single detection point. Reflection of electromagnetic waves or sound waves may also be employed.

The external sensor 10B obtains observation information including direction of light irradiated to each of a plurality of detection points (direction of the detection point with respect to the external sensor 10B), and information on the reflection light reflected from each of a plurality of detection points. The information on the reflection light is, for example, time elapsing from irradiation of light to receipt of the reflection light, an intensity of the received light (or an attenuation ratio between an emitted light intensity and a received light intensity), or the like. In addition, the external sensor 10B derives position information of the detection point using this elapsing time and outputs it to the information processing apparatus 20. Note that the position information of the detection point may be derived from the observation information using the information processing apparatus 20. In this embodiment, it is assumed that the external sensor 10B outputs position information of each detection point to the information processing apparatus 20 by way of example.

The external sensor 10B is, for example, an image sensing device, a distance sensor (such as a millimetric wave radar or a laser sensor), a sonar sensor that detects an object using sound waves, or the like. The image sensing device obtains photographic image data (hereinafter, referred to as a "photographic image") through photographing. The image sensing device is a stereoscopic camera, a position selection camera, or the like. When the image sensing device is used as the external sensor 10B, the position information may be geometrically derived using a simultaneous localization and mapping (SLAM) technique, a stereoscopic matching technique, and the like. The photographic image is digital image data obtained by defining pixel values for each pixel, a depth map obtained by defining a distance from the external sensor 10B for each pixel, or the like. The laser sensor is, for example, a two-dimensional or three-dimensional laser imaging detection and ranging (LIDAR) sensor provided in parallel with a horizontal surface.

In this embodiment, it is assumed that the external sensor 10B is the image sensing device by way of example.

In this embodiment, it is assumed that the external sensor 10B is provided such that travel direction of the moving object 10 is set as a photographing direction by way of example. For this reason, according to this embodiment, the external sensor 10B acquires position information on each detection point in a travel direction (that is, forward) of the moving object 10.

The internal sensor 10C is a sensor for observing information on the moving object 10 of itself. The internal sensor 10C acquires self position information. The self position information includes position information of the moving object 10. The position information of the moving object 10 is information representing a current position of the moving object 10. The internal sensor 10C is, for example, an inertial measurement unit (IMU), a speed sensor, a global positioning system (GPS), or the like. Note that it is assumed that the position information of the moving object 10 is expressed in a world coordinates system.

Figure 2:
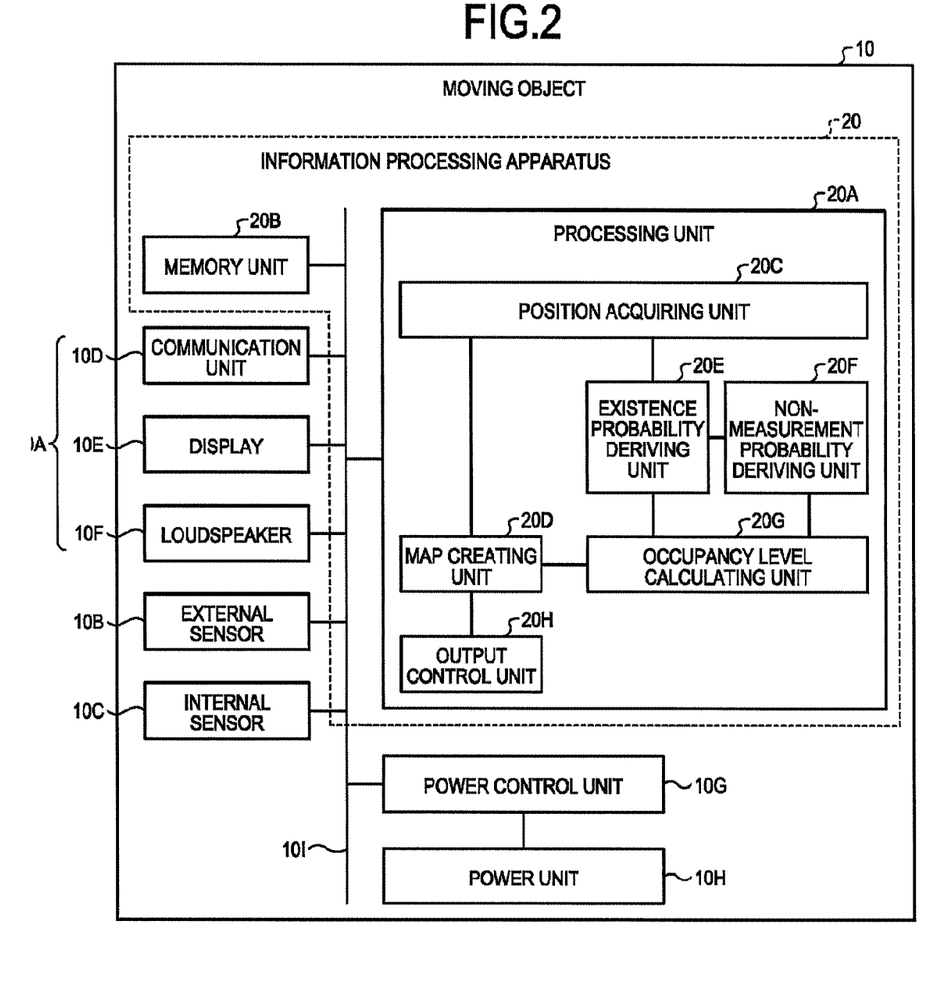
FIG. 2 is a block diagram illustrating a configuration of the moving object.

Next, an electric configuration of the moving object 10 will be described in details. FIG. 2 is a block diagram illustrating an exemplary configuration of the moving object 10.

The moving object 10 includes an information processing apparatus 20, an output unit 10A, an external sensor 10B, an internal sensor 10C, a power control unit 10G, and a power unit 10H. As described above, the output unit 10A includes a communication unit 10D, a display 10E, and a loudspeaker 10F.

The information processing apparatus 20, the output unit 10A, the external sensor 10E, the internal sensor 10C, and the power control unit 10G are connected to each other via a bus 10I. The power unit 10H is connected to the power control unit 10G.

The information processing apparatus 20 has a memory unit 20B and a processing unit 20A. That is, the output unit 10A, the external sensor 10B, the internal sensor 10C, the power control unit 10G, the processing unit 20A, and the memory unit 20B are connected to each other via the bus 10I.

Note that at least one of the memory unit 20E, the output unit 10A (including the communication unit 10D, the display 10E, and the loudspeaker 10F), the external sensor 10B, the internal sensor 10C, and the power control unit 10G may be connected to the processing unit 20A in a wired or wireless manner. In addition, at least one of the memory unit 20B, the output unit 10A (including the communication unit 10D, the display 10E, and the loudspeaker 10F), the external sensor 10C, the internal sensor 10C, and the power control unit 10G may be connected to the processing unit 20A via a network.

The memory unit 20B stores various types of data. The memory unit 20B is, for example, a random access memory (RAM), a semiconductor memory device such as a flash memory, a hard disk, an optical disk, or the like. Note that the memory unit 20B may be a storage device provided outside the information processing apparatus 20. In addition, the memory unit 20B may be a storage medium. Specifically, the storage medium may be a medium that stores or temporarily stores program or various types of information downloaded via a local area network (LAN), the Internet, or the like. Furthermore, the memory unit 20B may include a plurality of storage media.

The processing unit 20A includes a position acquiring unit 20C, a map creating unit 20E, an existence probability deriving unit 20E, a non-measurement probability deriving unit 20F, an occupancy level calculating unit 20G, and an output control unit 20H. The position acquiring unit 20C, the map creating unit 20D, the existence probability deriving unit 20E, the non-measurement probability deriving unit 20F, the occupancy level calculating unit 20G, and the output control unit 20H are implemented, for example, by a single or a plurality of processors. For example, each of the aforementioned units may be implemented by allowing a processor such as a central processing unit (CPU) to execute a program, that is, software. Each of the aforementioned units may be implemented by a processor such as a dedicated integrated circuit (IC), that is, hardware. Each of the aforementioned units may also be implemented by both software and hardware. When a plurality of processors is employed, each processor may implement one of the units or may implement two or more units.

Note that the terminology "processor" used in this embodiment refers to, for example, a CPU, a graphical processing unit (GPU), an application specific integrated circuit (ASIC), a programmable logic device (such as a simple programmable logic device (SPLD)), a complex programmable logic device (CPLD), or a field programmable gate array (FPGA) circuit.

The processor implements each of the aforementioned units by reading and executing a program stored in the memory unit 20B. Note that the program may be directly embedded in the circuit of the processor instead of storing it in the memory unit 20B. In this case, the processor implements each of the aforementioned units by reading and executing the program embedded in the circuit.

The position acquiring unit 20C acquires position-related information. The position-related information includes at least position information of the detection point. According to this embodiment, the position-related information includes position information of the detection point and the self position information.

According to this embodiment, the processing unit 20A derives the map by performing the following processing using the position-related information.

Figure 3A:
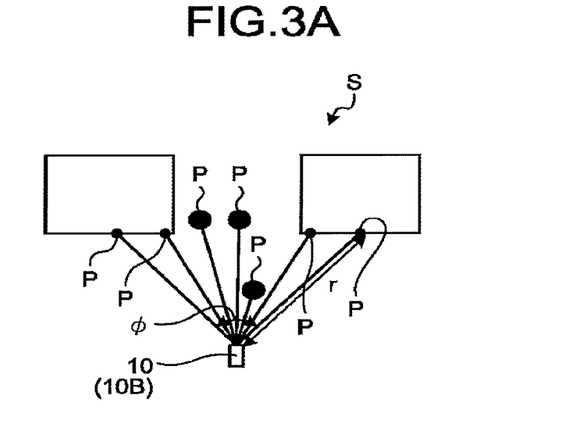
FIG. 3A is an explanatory diagram illustrating a process of deriving a map.

FIG. 3A is an explanatory diagram illustrating an example of deriving the map. As illustrated in FIG. 3A, the external sensor 10B mounted on the moving object 10 acquires position information on each of a plurality of detection points P in a real space S. The position acquiring unit 20C acquires the position information on each of a plurality of detection points P detected by the external sensor 10B.

Specifically, the position acquiring unit 20C acquires a density of the detection point P detectable by the external sensor 10B, that is, position information for the detection points P whose number corresponds to a resolution of the external sensor 10B. The position information of the detection point P is expressed, for example, in the polar coordinates system. Note that the external sensor 10B may acquire three-dimensional information of the detection point expressed in the Cartesian coordinates system. Note that, when the position information of the detection point P is expressed in the Cartesian coordinates system, the position acquiring unit 20C may convert the Cartesian coordinates into the polar coordinates.

In this embodiment, it is assumed that the position acquiring unit 20C acquires position information expressed in the polar coordinates system as the position information of the detection point P. That is, the position information of the detection point P is expressed using a distance "r" (also referred to as a "radius vector") and an angle "ϕ" (also referred to as a "deflection angle") in the polar coordinates space. The angle ϕ indicates a direction on the x-y plane parallel to an estimated ground surface during a travel of the moving object 10 (a plane orthogonal to the vertical direction) by setting the position of the moving object 10 as an origin.

Note that, according to this embodiment, a position of the moving object 10 and a current position of the moving object 10 refer to a current position of the moving object 10 mounted on the information processing apparatus 20. That is, the position information on the moving object 10 is information representing a position of the moving object 10 (current position).

Note that, according to this embodiment, a direction of the angle ϕ obtained by setting the current position of the moving object 10 as an origin on the x-y plane of the polar coordinates space may be referred to as an "angular direction." The x-y plane in the polar coordinates space is a plane orthogonal to the radial direction of the polar coordinates space. The angular direction (ϕ direction) refers to a direction indicating the angle ϕ from the x-axis or the y-axis out of a pair of deflection angles θ and ϕ perpendicular to the radial direction of the polar coordinates space. In addition, in this embodiment, the radial direction in the polar coordinates space will be referred to as a "distance direction." The radial direction refers to a direction (r-direction) indicating a distance (distance r) to the detection point P by setting the current position of the moving object 10 as an origin and also a direction along the radial axis.

Note that the position information of the detection point P is expressed in the polar coordinates system including the angle θ in practice. The angle θ is an angle with respect to the orthogonal line (z-axis) to the x-y plane parallel to the estimated ground surface during a travel of the moving object 10. In this embodiment, the angle θ will not be considered, so that it will not be described further.

Note that the position acquiring unit 20C may acquire the position information of the detection point P from an external device. In this case, the position acquiring unit 20C may acquire the position information of the detection point P from the external device via the communication unit 10D.

The self position information includes the position information of the moving object 10. According to this embodiment, the position acquiring unit 20C acquires the self position information from the internal sensor 10C. Note that it is assumed that the position information of the moving object 10 is expressed, for example, in the world coordinates system.

The position acquiring unit 20C outputs position-related information including position information of a plurality of detection points P and the self position information to the map creating unit 20D.

Returning to FIG. 2, description will be further made. Next, the map creating unit 20D will be described. The map creating unit 20D creates map.

Figure 3B:
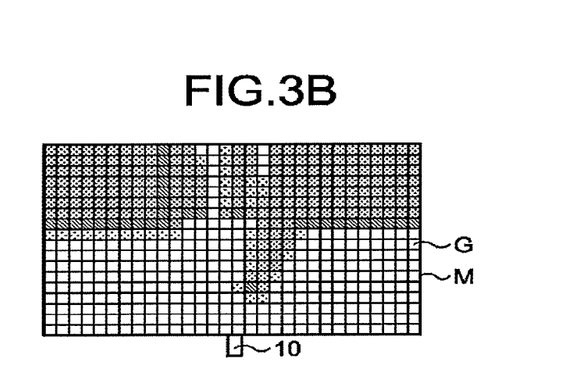
FIG. 3B is a schematic diagram illustrating an example of a displayed map M.

FIG. 3B is a schematic diagram illustrating an example of the displayed map M.

The map M is a map that defines an occupancy level of the target. According to this embodiment, the map M includes a plurality of domains G, and the occupancy level of the target calculated by the occupancy level calculating unit 20G is defined for each domain G.

The target is a specific target object having the occupancy level. The target may be appropriately set depending on a type of the target moving object 10 mounted with the information processing apparatus 20. The target is, for example, an obstacle. The obstacle is an object that obstructs a travel of the moving object 10 mounted with the information processing apparatus 20. The obstacle is, for example, a three-dimensional object such as another vehicle, a building, and a wall.

The occupancy level indicates an occupancy level of the target defined in the map M. According to this embodiment, the occupancy level is an occupancy level of the target defined for each domain C in the map M. The occupancy level of the target is a ratio of the domain G occupied by the target. The occupancy level of the target may be an existence probability of the target existing in the domain G. The occupancy level is expressed, for example, as a value having a range equal to or greater than 0.0 and equal to or smaller than 1.0.

The domain G is each of a plurality of regions obtained by dividing the map M. The shape of the domain G is not particularly limited. For example, the domain G has a rectangular shape. In addition, the shape of the domain G is not limited to a square. For example, the domain G may have an oblong shape or the like, or a fan shape divided by concentric circles having the moving object 10 at the center and radial lines.

Specifically, the map creating unit 20D creates the map M on the basis of the self position information of the moving object 10, domain information representing a size and position of the domain G, position information of the detection point P acquired from the position acquiring unit 20C, and an occupancy level distribution D3 calculated by the occupancy level calculating unit 20G. As a result, the map creating unit 20E acquires the map M. Specifically, the map creating unit 20D creates the map M by setting the occupancy levels for the domains G divided radially from the current position of the moving object 10 toward the detection point P acquired by the position acquiring unit 20C. The occupancy level calculating unit 20G will be described below in more details.

Returning to FIG. 2, description will be further made. The existence probability deriving unit 20E derives accuracy information of the external sensor 10B, position information acquired by the position acquiring unit 20C, and an existence probability distribution D1 of the target at each position and outputs them to the occupancy level calculating unit 20G. The existence probability deriving unit 20E derives the existence probability distribution D1 that changes depending on the measurement accuracy. For example, the existence probability deriving unit 20E derives the existence probability distribution D1 such that the spread becomes larger as the measurement accuracy of the external sensor 10B decreases, and the distribution becomes narrower (steep distribution) as the measurement accuracy increases.

Figure 4:
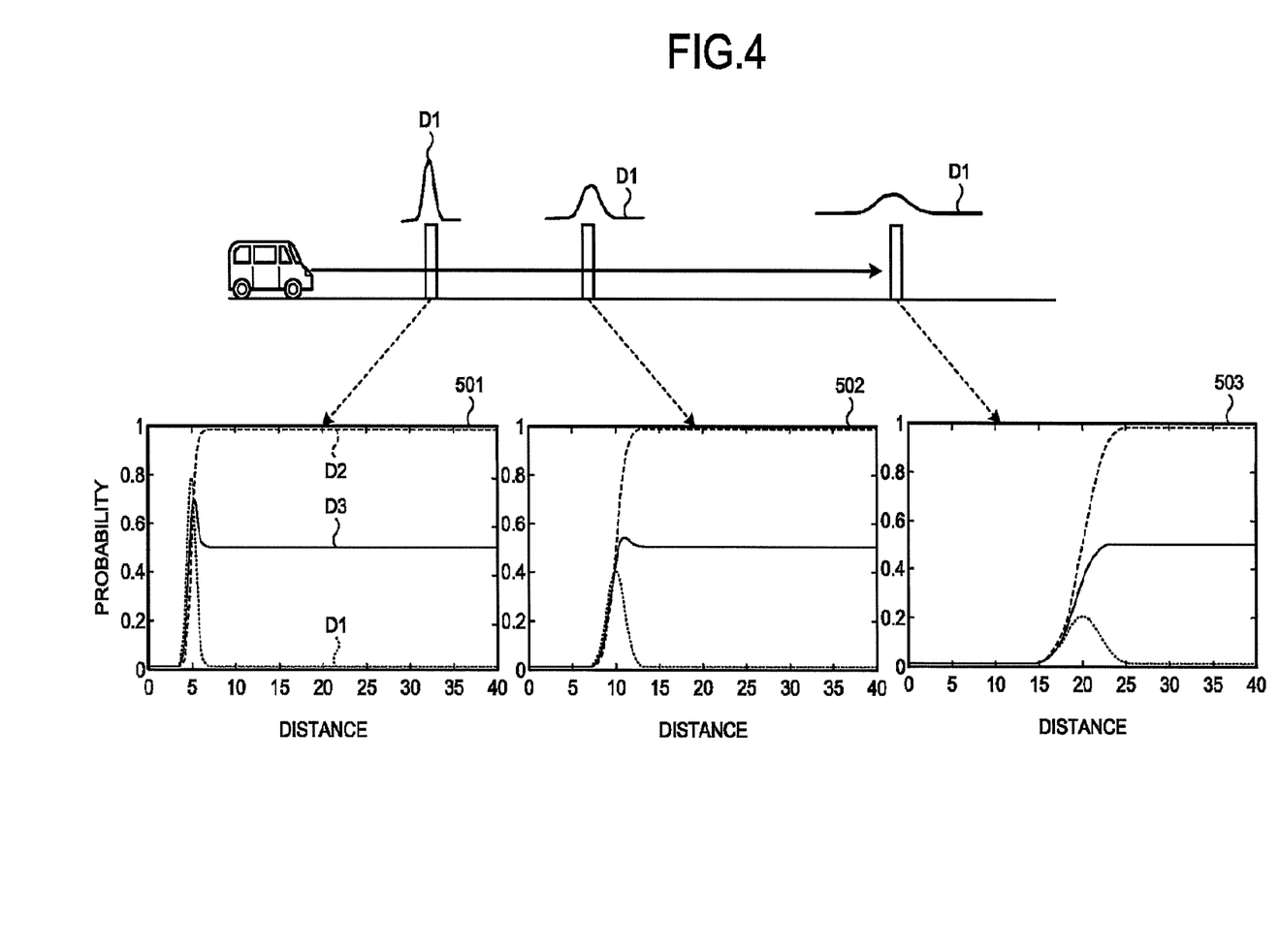
FIG. 4 is an explanatory diagram illustrating an occupancy level when a target exists.

The accuracy information of the external sensor 10B is information from which the existence probability at each position of the target can be derived when a specific output of the external sensor 10B is obtained. FIG. 4 illustrates an exemplary existence probability distribution D1.

For example, when the external sensor 10B is a stereoscopic camera, the measurement accuracy decreases as the distance increases. Therefore, information derived from the distance from the external sensor 10B can be used as the accuracy information. For example, the existence probability deriving unit 20E derives the existence probability distribution D1 expressed as a normal distribution having an average value at a position indicated by the position information acquired by the position acquiring unit 20C and a variance proportional to the accuracy information (distance).

This normal distribution is, for example, a one-dimensional normal distribution expressing a probability distribution for the distance along a direction from the position of the external sensor 10B to the target. The existence probability distribution D1 is derived for each detected target. FIG. 4 illustrates three exemplary graphs 501, 502, and 503 including the existence probability distributions D1 corresponding to three detected targets. In FIG. 4, the distance becomes farther, and the variance of the existence probability distribution D1 increases in the order of the graphs 501, 502, and 503.

For example, if the external sensor 10B is a laser sensor, the measurement accuracy decreases as the reflection intensity (intensity of received light) decreases. Therefore, the information derived from the reflection intensity can be used as accuracy information. For example, the existence probability deriving unit 20E derives the existence probability distribution D1 expressed as a normal distribution having an average value at the position indicated by the position information acquired by the position acquiring unit 20C and a variance inversely proportional to the accuracy information (reflection intensity).

The accuracy information of the external sensor 10B is not limited to the information derived from the distance and the reflection intensity, but may include any type of information as long as it represents accuracy of the external sensor 10B when the position of the target is detected.

The existence probability distribution D1 is not limited to the normal distribution. For example, the existence probability distribution D1 may be a nonparametric distribution created from a plurality of sensor values experimentally measured in advance using machine learning and position information of a real target. In addition, the existence probability distribution D1 at each value of the parameters (such as the distance and the reflection intensity) relating to accuracy of the external sensor 10B may be calculated in advance and stored in a memory, and the stored value may be read. Without limiting to the aforementioned configuration, any method of calculating the existence probability distribution known in the art may also be employed.

Returning to FIG. 2, description will be further made. The non-measurement probability deriving unit 20F derives a non-measurement probability distribution. The non-measurement probability distribution is a probability distribution that changes depending on the position indicated by the position information and the measurement accuracy of the external sensor 10B to express a probability that a target is not measured by the external sensor 10B. For example, the non-measurement probability deriving unit 20F calculates a non-measurement probability distribution D2 at each position from the existence probability distribution obtained by the existence probability deriving unit 20E and outputs it to the occupancy level calculating unit 20G.

The non-measurement probability distribution D2 may be calculated by accumulating the existence probability distribution D1 from the position (sensor position) of the external sensor 10B toward the target. A non-measurement situation occurs when the target exists in a certain position, and a rear side of the target position is not measured due to blocking as seen from the sensor position. For this reason, the non-measurement probability may be substituted with a blocking probability. That is, accumulation of the existence probability distribution D1 from the sensor position to the target position corresponds to the non-measurement probability at that position.

For example, when the existence probability distribution D1 is defined as a normal distribution function, the non-measurement probability deriving unit 20F sets a non-measurement probability distribution D2 in an analytic manner by integrating the existence probability distribution D1.

FIG. 4 also illustrates an example of the non-measurement probability distribution D2. In the order of the graphs 501, 502, and 503, a change in the non-measurement probability distribution D2 becomes gentle, and a boundary between the measurement region and the non-measurement region becomes unclear.

When the existence probability distribution D1 is defined in a nonparametric manner, it is difficult to integrate the existence probability distribution in an analytical manner. In this case, the non-measurement probability deriving unit 20F may approximately derive the non-measurement probability distribution D2 using numerical integration.

Returning to FIG. 2, description will be further made. The occupancy level calculating unit 20G derives the occupancy level (occupancy level distribution) indicating a level of occupancy, by the target, of each of a plurality of regions.

Figure 5A:
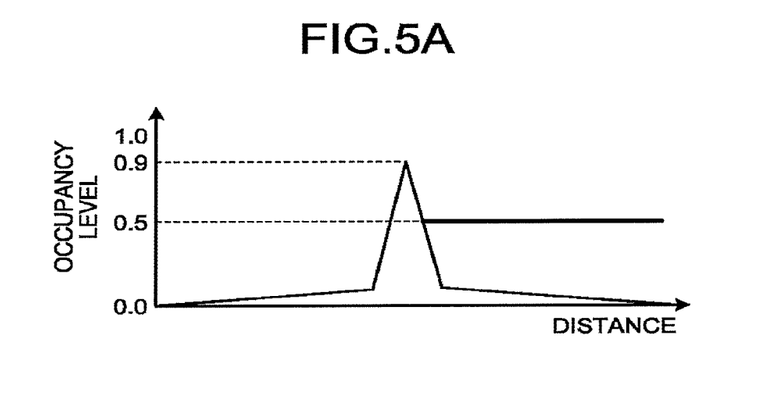
FIG. 5A is an explanatory diagram illustrating an example of setting the occupancy level.
Figure 5B:
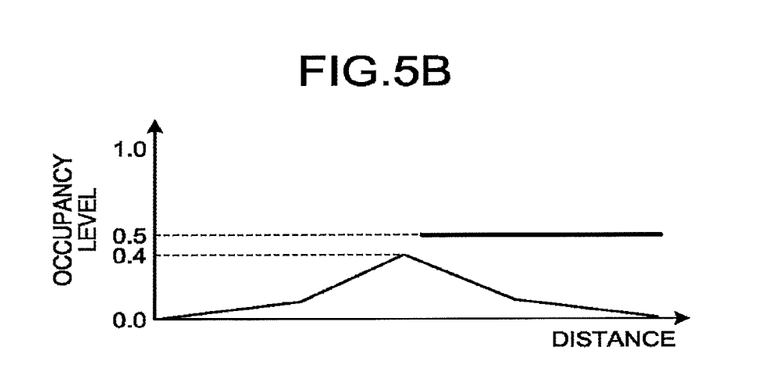
FIG. 5B is an explanatory diagram illustrating an example of setting the occupancy level.

FIGS. 5A and 5B are explanatory diagrams illustrating an exemplary occupancy level distribution used when existence of the target is unknown and a fixed median value (0.5) is set as the occupancy level. FIG. 5A illustrates an example of the occupancy level when the position of the target is detected with high accuracy (0.9). FIG. 5B illustrates an example f the occupancy level when the position of the target is detected with low accuracy (0.4). When existence of the target is unknown and the fixed median value is set as the occupancy level, it is likely that the median value increases from the occupancy level at the position of the target as illustrated in FIG. 5B. That is, it may be difficult to set an appropriate occupancy level in some cases.

In this regard, the occupancy level calculating unit 20G according to this embodiment calculates the occupancy level distribution on the basis of the position information and measurement accuracy of the external sensor 10B. The occupancy level distribution is calculated as a distribution based on the non-measurement probability distribution. For example, the occupancy level calculating unit 20G calculates the occupancy level distribution D3 from the existence probability distribution D1 acquired by the existence probability deriving unit 20E and the non-measurement probability distribution D2 acquired by the non-measurement probability deriving unit 20F and outputs it to the map creating unit 20D.

The occupancy level calculating unit 20G calculates the occupancy level distribution D3, for example, by obtaining a weighted sum of the existence probability distribution D1 and the non-measurement probability distribution D2. For example, FIG. 4 illustrates the occupancy level distribution D3 calculated by applying a weight of 0.5 to the existence probability distribution D1 and the non-measurement probability distribution D2 and adding them. The weight is not limited to 0.5, but any value may be employed. Since the measurement accuracy of the external sensor 10B is high at the distance corresponding to the graph 501, nearly the same occupancy level as that of FIG. 5A is obtained.

Meanwhile, at the distance corresponding to the graph 502, the measurement accuracy of the external sensor 10B is low, and the peak of the existence probability distribution D1 is lower than 0.5. However, the occupancy level distribution D3 is appropriately obtained. A peak position of the occupancy level distribution D3 is slightly deviated backward relative to the peak of the existence probability distribution D1. This is because the rear side of the target is not measured, and a possibility of existence of the target remains although the front side of the target is measured, and it is apparent that no target exists. That is, there is no theoretical problem if the existence probability of the rear side becomes high.

At the distance corresponding to the graph 503, the measurement accuracy is significantly low. Therefore, the position of the target is unknown, but at least a fact that the rear side of the target is not measured is correctly reflected in the occupancy level distribution D3.

The occupancy level calculating unit 20G may calculate the occupancy level distribution D3 only from the non-measurement probability distribution D2, without using the existence probability distribution D1. This is because, in the control of the moving object, it is important to know a region allowed to travel, that is, a region where no target exists through measurement, and it is not indispensable to distinguish between the non-measurement region and the region where an object exists.

The description has been made hereinbefore by assuming that the existence of the target is measured by the external sensor 10B. Even when it is measured that "no target exists," it is possible to appropriately calculate the occupancy level distribution D3.

If no target exists in a certain place, both a fact that no target exists in front of it, and a fact that the backside is not measured are known. In this case, the occupancy level calculating unit 20G does not use the existence probability distribution D1 in calculation of the occupancy level distribution D3. For example, the occupancy level calculating unit 20G calculates the occupancy level distribution D3 by multiplying the non-measurement probability distribution D2 by a constant (for example, 0.5 times).

Similar to a case where it is measured that "a target exists," the existence probability deriving unit 20E may calculate the existence probability even when it is measured that "no target exists." For example, the existence probability deriving unit 20E derives the existence probability distribution D1 using a position where it is measured that no target exists instead of a position where it is measured that a target exists. The existence probability deriving unit 20E may derive the existence probability distribution D1 using a nonparametric distribution measured in advance under a situation that no target exists.

Similar to a case where it is measured that "a target exists," the non-measurement probability deriving unit 20F may also derive the non-measurement probability distribution D2 by integrating the existence probability distribution D1 when it is measured that "no target exists."

Figure 6:
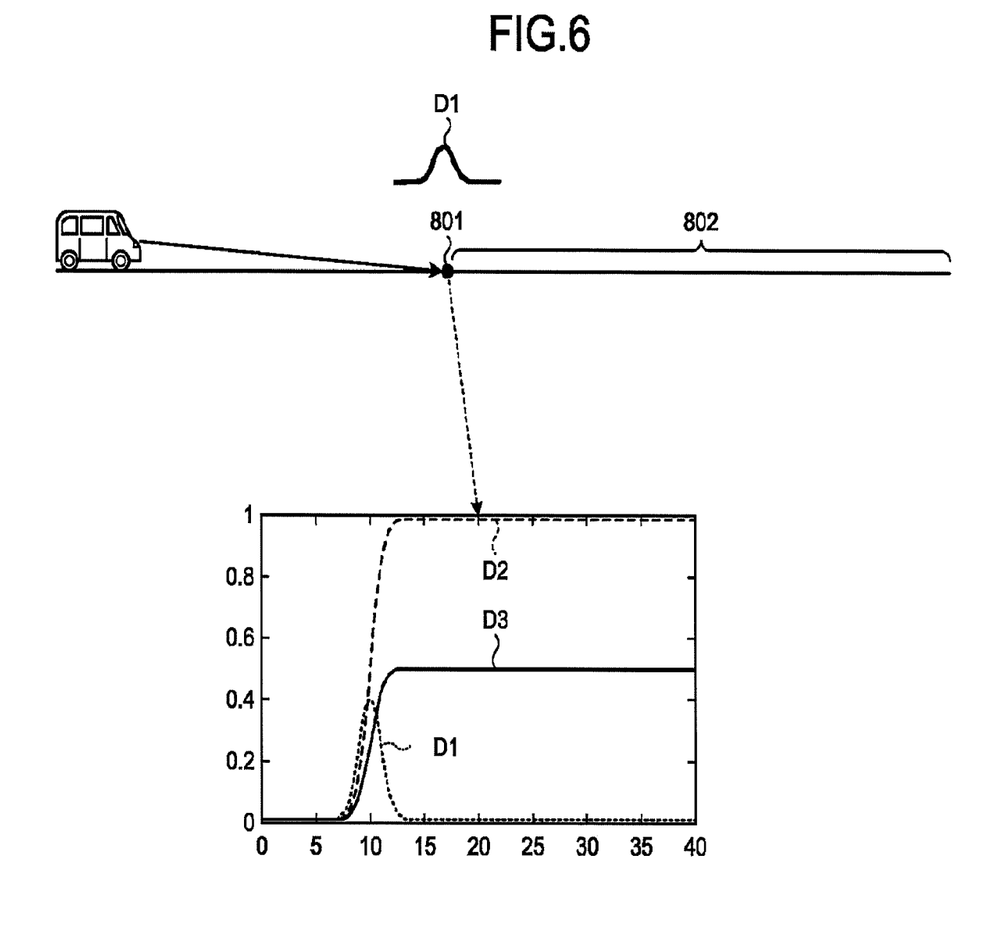
FIG. 6 is an explanatory diagram illustrating an occupancy level when no target exists.

FIG. 6 is a diagram illustrating examples of the existence probability distribution D1, the non-measurement probability distribution D2, and the occupancy level distribution D3 when no target exists. FIG. 6 illustrates an example when it is measured that no target exists in the same position 801 as that corresponding to the graph 502 of FIG. 4. The region 802 indicates a region where it is unclear whether or not a target exists. As illustrated in FIG. 6, when it is measured that no target exists in the position 801, it is possible to appropriately calculate the occupancy level distribution D3 from the non-measurement probability distribution D2.

In this embodiment, for convenient description purposes, a functionality of deriving the existence probability distribution D1 from the accuracy information of the external sensor 10B (existence probability deriving unit 20E), and a functionality of deriving the non-measurement probability distribution D2 from the existence probability distribution D1 (non-measurement probability deriving unit 20F) have been described. These functionalities may not be provided as long as the same functionalities can be implemented.

For example, the non-measurement probability deriving unit 20F may directly calculate the non-measurement probability distribution D2 from the accuracy information of the external sensor 10B. In addition, the non-measurement probability distribution at each value of the parameters relating to the accuracy of the external sensor 10B (such as the distance or the reflection intensity) may be calculated in advance, may be stored in a memory, and may be read. In this configuration, the existence probability deriving unit 20E may not be provided.

Similarly, for example, when a distribution obtained by multiplying the non-measurement probability distribution D2 by a constant is set as the occupancy level distribution D3, the occupancy level calculating unit 20G may directly calculate the occupancy level distribution D3 from the accuracy information of the external sensor 10B. The occupancy level calculating unit 20G may calculate the occupancy level distributions at each value of the accuracy information in advance and store them in the memory, so that the occupancy level distribution corresponding to the accuracy information during the measurement is read. In this configuration, the existence probability deriving unit 20E and the non-measurement probability deriving unit 20F may not be provided.

The position information of each point observed by the external sensor 10B may include other points in addition to the point on the target. The points other than the point on the target include a road surface that does not hinder a travel of the vehicle, or the like.

Whether or not a target exists may be determined, for example, in the following way.

(1) Determine the existence of the target by dividing the position information into horizontal and vertical planes: for example, determine the existence of the target by setting the vertical plane as a target.

(2) Determine the existence of the target by applying a pattern recognition technique to the position information or the image data: It is determined that a target exists when the position information or the image data matches a predetermined pattern of the target. It is determined that no target exists when the position information or the image data does not match the pattern of the target.

(3) Determine the existence of the target from the reflection intensity of the irradiated light: It is determined that a target exists when the reflection intensity has a predetermined value or pattern, or the like.

Returning to FIG. 2, description will be further made. The output control unit 20H controls the output of the map M created by the map creating unit 20D.

The output control unit 20H outputs the map M to the power control unit 10G that controls the power unit 10H of the moving object 10.

The output control unit 20H displays the map M on the display 10E. According to this embodiment, the output control unit 20H displays a presentation screen including the map M on the display 10E.

FIG. 3B is a schematic diagram illustrating an exemplary presentation screen. The presentation screen includes a map M created by the map creating unit 20D. For this reason, a user easily recognizes the occupancy ratio of the target object by checking the presentation screen.

Returning to FIG. 2, description will be further made. The output control unit 20H may control the display 10E or the loudspeaker 10F such that sound or light representing the occupancy level for each domain G presented on the map M is output. In addition, the output control unit 20H may transmit the map M to an external device via the communication unit 10D. For example, when there is a domain G having a high occupancy level in the travel direction of the moving object 10, the display 10E may be flickered, or an alert sound may be output from the loudspeaker 10F.

The output control unit 20H may output the map H to the power control unit 10G.

In this case, the power control unit 10G controls the power unit 10H depending on the map M received from the output control unit 20H. For example, the power control unit 10G may generate a power control signal for controlling the power unit 10H depending on the map M to control the power unit 10H. The power control signal is a control signal for controlling a driving unit that drives a travel of the moving object 10 in the power unit 10H. For example, the power control unit 10G controls steering of the moving object 10, an engine, or the like such that the moving object 10 travels in the region of the real space S corresponding to the domain G, displayed on the map M, representing an occupancy ratio showing a region allowed to travel.

Figure 7:
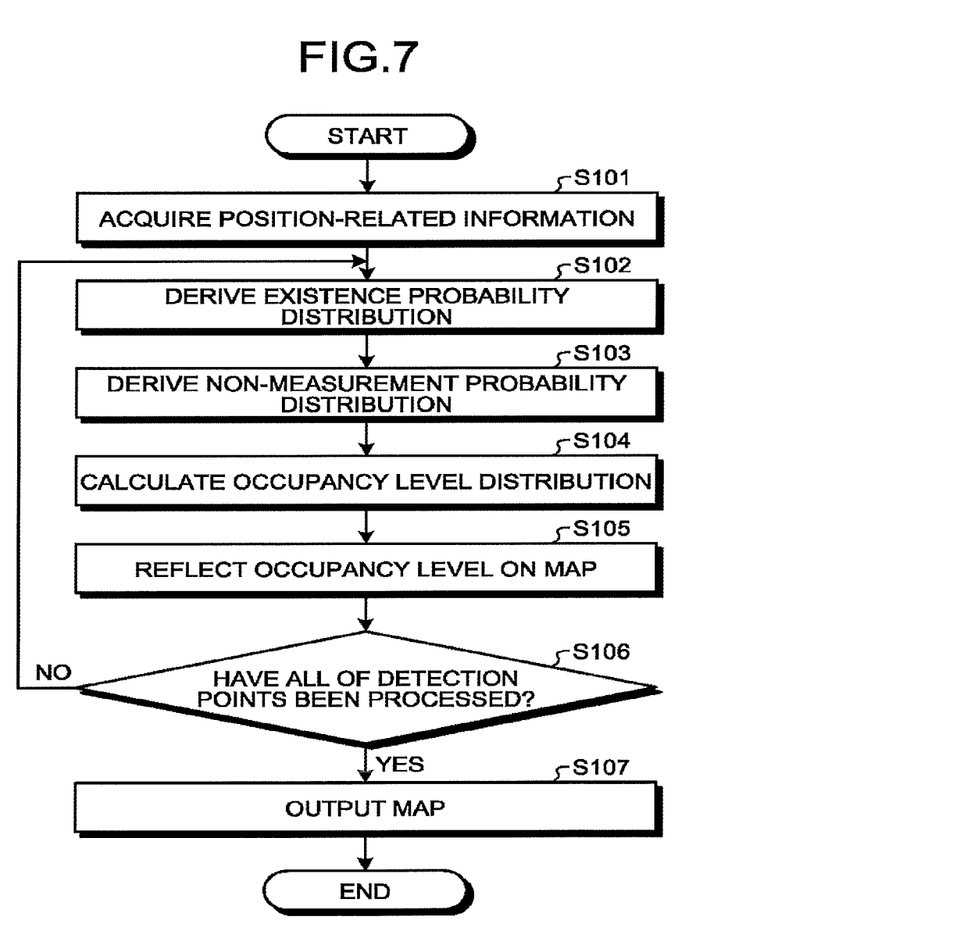
FIG. 7 is a flowchart illustrating an information processing sequence.

Next, an exemplary information processing sequence executed by the information processing apparatus 20 according to this embodiment will be described. FIG. 7 is a flowchart illustrating an exemplary information processing sequence executed by the information processing apparatus 20 according to this embodiment.

The position acquiring unit 20C acquires the position-related information (step S101). As described above, the position-related information includes position information of the detection point. The following processes (steps S102 to S105) are executed for each detection point (target) for which the position information has been acquired.

The existence probability deriving unit 20E derives the existence probability distribution D1 for an unprocessed detection point from the accuracy information of the external sensor 10B and the position information of the corresponding detection point (step S102). The non-measurement probability deriving unit 20F derives the non-measurement probability distribution D2 by integrating the existence probability distribution D1 (step S103). The occupancy level calculating unit 20G calculates the occupancy level distribution D3 from the existence probability distribution D1 and the non-measurement probability distribution D2 (step 104). The map creating unit 20D reflects the calculated occupancy level distribution D3 on the map M (step S105).

The processing unit 20A determines whether or not all of the detection points have been processed (step S106). If all of the detection points have not been processed (step S106: No), the process returns to step S102 to repeat the processing for the next detection point. If all of the detection points have been processed (step S106: Yes), the output control unit 20H outputs the map M (step S107) and terminates the information processing.

As described above, the information processing apparatus 20 according to this embodiment includes the existence probability deriving unit 20E, the non-measurement probability deriving unit 20F, and the occupancy level calculating unit 20G. The existence probability deriving unit 20E acquires the existence probability distribution D1 of the target at each position from the accuracy information of the external sensor 10B and the position information acquired by the position acquiring unit 20C. The non-measurement probability deriving unit 20F calculates the non-measurement probability distribution D2 representing a probability that a target is not measured by the external sensor 10B at each position from the existence probability distribution D1. The occupancy level calculating unit 20G calculates the occupancy level distribution D3 from the existence probability distribution D1 and the non-measurement probability distribution D2.

In this manner, the information processing apparatus 20 according to this embodiment calculates the occupancy level of the unmeasured position backside of the target using the non-measurement probability distribution D2. For this reason, it is possible to appropriately calculate the occupancy level distribution D3 even when the accuracy of the external sensor 10B is low, and the peak of the existence probability distribution D1 is lower than 0.5.

Meanwhile, as described above, in the related art, it is difficult to appropriately calculate the occupancy level distribution when the peak of the existence probability distribution D1 is low. Therefore, using the information processing apparatus 20 according to this embodiment, it is possible to improve reliability of the occupancy level of the target.

The information processing apparatus 20 according to this embodiment can calculate the non-measurement probability distribution D2 even when no target exists. For this reason, it is possible to calculate the occupancy level distribution D3 from the information obtained by measuring a fact that "no target exists" as well as information obtained from the external sensor 10B by measuring the target.

Meanwhile, in the related art, it is assumed that a target exists. Therefore, it is impossible to calculate the occupancy level from the information representing that no target exists. Therefore, using the information processing apparatus 20 according to this embodiment, it is possible to improve reliability of the occupancy level of the target.

Figure 8:
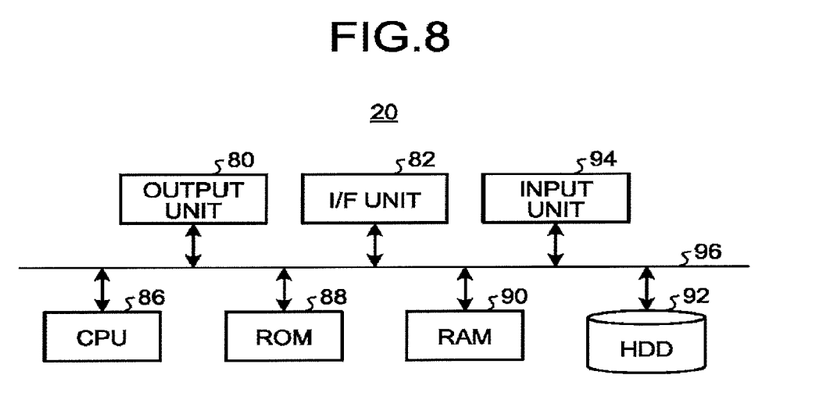
FIG. 8 is a hardware configuration diagram.

Next, an exemplary hardware configuration of the information processing apparatus 20 according to the aforementioned embodiment will be described. FIG. 8 is an exemplary hardware block diagram illustrating the information processing apparatus 20 according to this embodiment.

The information processing apparatus 20 according to the aforementioned embodiment includes: a control unit such as a CPU 86; a memory unit such as a read-only memory (ROM) 88, a 90, or a hard disk drive (HDD) 92; an I/F unit 82 as an interface with various devices; an output unit 80 that outputs various types of information such as the output information; an input unit 94 that receives a user's manipulation; and a bus 96 that connects each unit. This is a hardware configuration using a typical computer.

In the information processing apparatus 20 according to the aforementioned embodiment, each unit is implemented on the computer by allowing the CPU 86 to read the program from the ROM 88 and execute it on the RAM 90.

Note that the program for executing each of the processes executed by the information processing apparatus 20 according to the aforementioned embodiment may be stored in the HDD 92. In addition, the program for executing each of the aforementioned processes executed by the information processing apparatus 20 according to the aforementioned embodiment may be embedded in the ROM 88 in advance.

The program for executing the aforementioned processes executed by the information processing apparatus 20 according to the aforementioned embodiment may be stored in a computer readable storage medium such as a CD-ROM, a CD-R, a memory card, a digital versatile disk (DVD), and a flexible disk (FD) in an installable or executable format file and may be provided as a computer program product. In addition, the program for executing the aforementioned processes executed by the information processing apparatus 20 according to the aforementioned embodiment may be stored in a computer connected via a network such as the Internet and may be downloaded via the network. Furthermore, the program for executing the aforementioned processes executed by the information processing apparatus 20 according to the aforementioned embodiment may be provided or distributed via a network such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more processors configured to:
acquire position information representing a position where a target exists or no target exists, the position being measured by a sensor;
derive an existence probability distribution representing an existence probability of the target, based on the position information and the measurement accuracy, the existence probability distribution changing depending on measurement accuracy of the sensor;
derive a non-measurement probability distribution representing a probability that the position information is not measured by accumulating the existence probability in a direction from the position of the sensor to the position indicated by the position information; and calculate an occupancy level distribution representing an existence probability of the target in each of a plurality of regions existing along a direction from the position of the sensor to the position indicated by the position information, based on the existence probability distribution and the non-measurement probability distribution.

2. The apparatus according to claim 1, wherein the one or more processors calculate the occupancy level distribution based on a weighted sum of the existence probability distribution and the non-measurement probability distribution.

3. The apparatus according to claim 1, wherein the one or more processors derive the existence probability distribution as a normal distribution having a larger variance as the measurement accuracy decreases.

4. The apparatus according to claim 1, the one or more processors further configured to create a map in which the existence probability based on the occupancy level distribution is set in a plurality of domains obtained by dividing a region including a measurement range of the sensor.

5. The apparatus according to claim 1, wherein the measurement accuracy is derived from a distance from the position of the sensor the position indicated by the position information.

6. The apparatus according to claim 1, wherein the sensor measures the target by receiving light reflected on the target, and the measurement accuracy is derived from an intensity of the light received by the sensor.

7. A moving object apparatus comprising:

a sensor;

the information processing apparatus according to claim 1; and a power controller configured to control power of the moving object based on the occupancy level distribution.

8. An information processing method comprising:

acquiring position information representing a position where a target exists or no target exists, the position being measured by a sensor;

deriving an existence probability distribution representing an existence probability of the target, based on the position information and the measurement accuracy, the existence probability distribution changing depending on measurement accuracy of the sensor;

deriving a non-measurement probability distribution representing a probability that the position information is not measured by accumulating the existence probability in a direction from the position of the sensor to the position indicated by the position information; and calculating an occupancy level distribution representing an existence probability of the target in each of a plurality of regions existing along a direction from the position of the sensor to the position indicated by the position information, based on the existence probability distribution and the non-measurement probability distribution.

9. A computer program product comprising a non-transitory computer-readable medium including programmed instructions, the instructions causing a computer to execute:

acquiring position information representing a position where a target exists or no target exists, the position being measured by a sensor;

deriving an existence probability distribution representing an existence probability of the target, based on the position information and the measurement accuracy, the existence probability distribution changing depending on measurement accuracy of the sensor;

deriving a non-measurement probability distribution representing a probability that the position information is not measured by accumulating the existence probability in a direction from the position of the sensor to the position indicated by the position information; and calculating an occupancy level distribution representing an existence probability of the target in each of a plurality of regions existing along a direction from the position of the sensor to the position indicated by the position information, based on the existence probability distribution and the non-measurement probability distribution.

* * * * *